United States Patent [19]
Schmittle

[11] Patent Number: 5,340,057
[45] Date of Patent: Aug. 23, 1994

[54] THRUST VECTORING FREE WING AIRCRAFT

[75] Inventor: Hugh Schmittle, Westminster, Md.

[73] Assignee: Freewing Aerial Robotics Corporation, College Park, Md.

[21] Appl. No.: 850,913

[22] Filed: Mar. 13, 1992

Related U.S. Application Data

[63] Continuation-in-part of Ser. No. 795,329, Nov. 21, 1991.

[51] Int. Cl.$^5$ ............................................. B64C 3/38
[52] U.S. Cl. ..................................... 244/48; 244/7 B; 244/39
[58] Field of Search ............ 244/7 B, 7 C, 7 R, 23 R, 244/38, 39, 190, 48

[56] References Cited

U.S. PATENT DOCUMENTS

| | | | |
|---|---|---|---|
| Re. 18,181 | 9/1931 | Stelzer | 244/38 |
| 1,016,929 | 2/1912 | Black | 244/38 |
| 1,771,257 | 7/1930 | Ingram | 244/48 |
| 1,772,586 | 8/1930 | Wilford | 244/37 |
| 1,845,307 | 2/1932 | Maxwell | 244/7 C |
| 1,861,336 | 5/1932 | Cox | 244/7 C |
| 2,058,678 | 10/1936 | Fry | 244/7 B |
| 2,063,030 | 12/1936 | Crouch | 244/7 C |
| 2,066,649 | 1/1937 | Sabins | 244/38 |
| 2,118,987 | 5/1938 | Smith | 244/48 |
| 2,347,230 | 4/1944 | Zuck | 244/82 |
| 2,362,224 | 11/1944 | Roseland | 244/48 |
| 2,580,312 | 12/1951 | Moore | 244/7 C |
| 2,584,667 | 2/1952 | Bockrath | 244/38 |
| 2,623,712 | 12/1952 | Spratt | 244/48 |
| 2,708,081 | 5/1955 | Dobson | 244/7 C |
| 2,959,373 | 11/1960 | Zuck | 244/7 |
| 3,035,789 | 5/1962 | Young | 244/7 |
| 3,166,271 | 1/1965 | Zuck | 244/7 |
| 3,236,182 | 2/1966 | Dahm | 102/50 |
| 3,415,469 | 12/1968 | Spratt | 244/48 |
| 3,477,664 | 11/1969 | Jones | 244/48 |
| 3,561,702 | 2/1971 | Jones | 244/16 |
| 3,730,459 | 5/1973 | Zuck | 244/48 |
| 4,124,180 | 11/1978 | Wolowicz | 244/82 |
| 4,415,132 | 11/1983 | Shirk | 244/45 |
| 4,568,043 | 2/1986 | Schmittle | 244/48 |
| 4,596,368 | 6/1986 | Schmittle | 244/48 |
| 4,730,795 | 3/1988 | David | 244/7 R |
| 4,928,907 | 5/1990 | Zuck | 244/48 |
| 4,967,984 | 11/1990 | Allen | 244/35 |
| 5,086,993 | 2/1992 | Wainfan | 244/48 |
| 5,098,034 | 3/1992 | Lendriet | 244/39 |

FOREIGN PATENT DOCUMENTS

| | | |
|---|---|---|
| 790597 | 11/1935 | France . |
| 997796 | 1/1952 | France . |
| 7209 | of 1909 | United Kingdom .................. 244/38 |
| 732657 | 6/1955 | United Kingdom ................ 244/7 B |

OTHER PUBLICATIONS

NASA Contractor Report 2946, "Analytical Study of a Free-Wing/Free-Trimmer Concept," Porter et al., Feb. 1978, pp. v–115.

NASA Contractor Report 3135, "Extended Analytical Study of the Free-Wing/Free-Trimmer Concept," Porter et al., 1979, pp. iii–85.

Primary Examiner—David A. Bucci
Assistant Examiner—Anne E. Bidwell
Attorney, Agent, or Firm—Lowe, Price, LeBlanc & Becker

[57] ABSTRACT

The VTOL aircraft includes a free wing having wings on opposite sides of the fuselage connected to one another for joint free rotation and for differential pitch settings under pilot, computer or remote control. On vertical launch, pitch, yaw and roll control is effected by the elevators, rudder and the differential pitch settings of the wings, respectively. At launch, the elevator pitches the fuselage nose downwardly to alter the thrust vector and provide horizontal speed to the aircraft whereby the free wing freely rotates relative to the fuselage into a generally horizontal orientation to provide lift during horizontal flight. Transition from horizontal to vertical flight is achieved by the reverse process and tile aircraft may be gently recovered in or on a resilient surface such as a net.

18 Claims, 2 Drawing Sheets

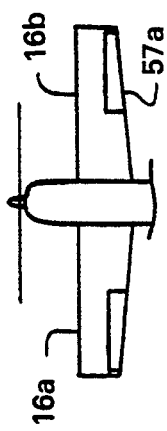
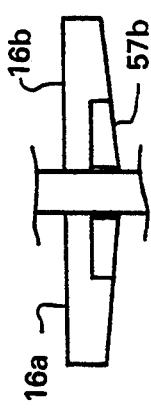
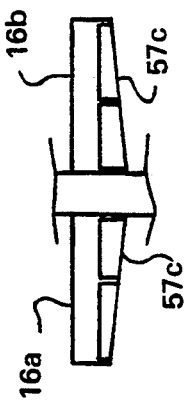
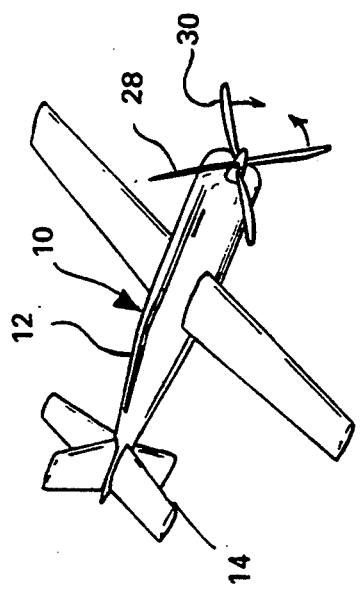
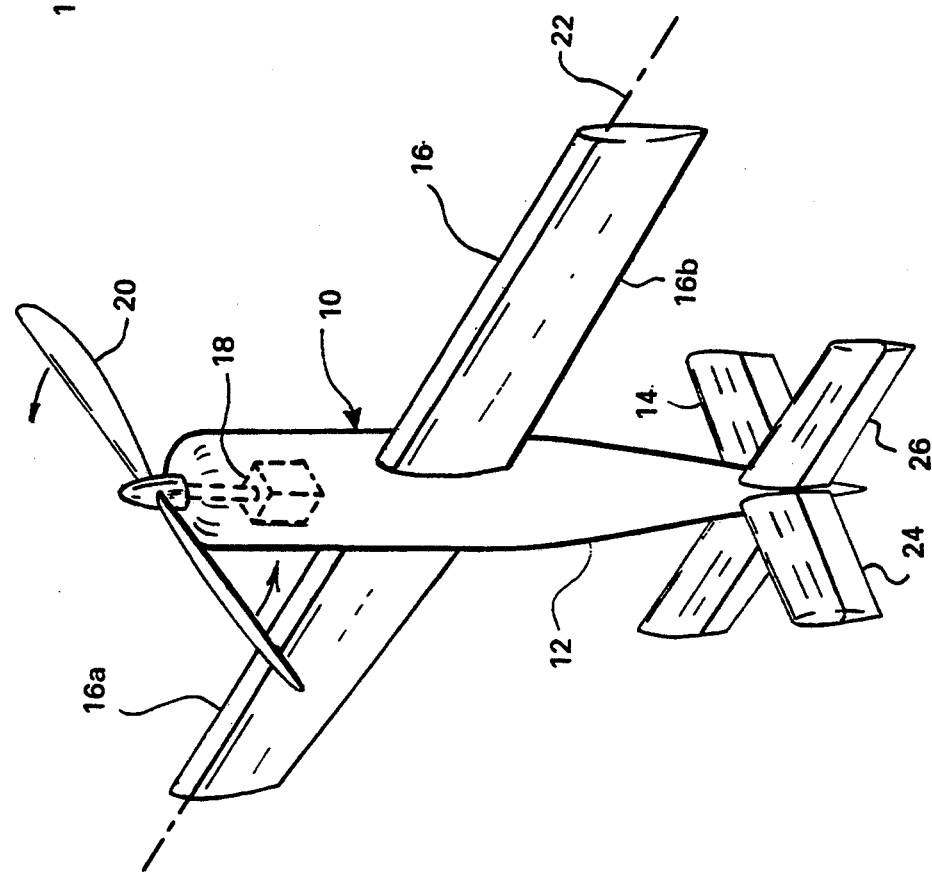

THRUST VECTORING FREE WING AIRCRAFT

RELATED APPLICATIONS

This application is a continuation-in-part of prior application Ser. No. 07/795,329, filed Nov. 21, 1991, the disclosure of which is incorporated herein by reference.

BACKGROUND AND SUMMARY OF THE INVENTION

The present invention generally relates to a vertical take-off and landing (VTOL) aircraft having a wing free for rotation about a spanwise axis to maintain a constant angle of attack with the relative wind. More particularly, the present invention relates to a VTOL aircraft having a free wing comprised of left and right wings projecting on opposite sides of the fuselage and mounted to the fuselage for free joint pivotal movement about a spanwise axis forward of the aerodynamic centers and controlled pivotal movement relative to one another for roll control during vertical and horizontal flight, as well as transitions therebetween.

As discussed in my prior application, a free wing or "freewing" is a wing attached to an aircraft fuselage in a manner such that the wing is freely pivotable about its spanwise axis forward of its aerodynamic center. This arrangement enables the wing to have an angle of attack which is determined solely by aerodynamic forces acting on the wing. Rotation of the wing, without pilot intervention, induced by changes in the direction of wind over the wing surfaces causes the angle of incidence between the wing and the aircraft fuselage to vary so that the wing presents a constant angle of attack to the relative wind which, in horizontal flight, enables the aircraft to be essentially stall-free.

Among other advantages realized when employing a free wing in horizontal flight are increased resistance to stalls, increased C.G. (center of gravity) range, alleviation of gust loads, e.g., on the order of a 4:1 reduction, extension of the payload capability due to the ability to reduce the structural weight of the aircraft and the ability to utilize a smaller engine with a lower fuel requirement, thus increasing flight range of the aircraft.

One the major advantages of a free wing aircraft is that the aircraft is intrinsically stable, i.e., much more stable than conventional fixed wing aircraft in response to atmospheric turbulence. In accordance with the present invention, a free wing aircraft is provided, preferably for use as an unmanned aerial vehicle where a highly stable platform is necessary and desirable, although the vehicle could be manned. For example, unmanned aerial vehicles (UAV) are often used by the military as platforms for maintaining sensors trained on a target. The sensor, for example, may comprise a video camera or a laser spot designator. UAV aircraft are highly desirable for their target standoff ability and, importantly, are usable without risk to pilots of fixed wing aircraft performing the same mission. Where generally low wing loaded (i.e., light) fixed wing UAV aircraft have been used for this purpose, their high sensitivity to turbulence, particularly at low altitudes, requires a stabilization system for onboard sensors to counter turbulence-induced platform motion. Such stabilization systems typically use gimballing, which cause the system to be heavy, complex and expensive. The high stability of a free wing aircraft eliminates or minimizes the stabilization problem in a UAV aircraft because the platform itself, i.e., the fuselage, is much more stable, even in low-altitude, highly turbulent conditions.

Vertical take-off and landing capability of UAV aircraft is also desirable. Take-off and landing sites for conventional fixed wing UAV aircraft, particularly in a military scenario, involve substantial costs which practically eliminate use of UAV aircraft from mobile launch sites, for example, small naval ships or tracked vehicles, or else require such complex launch schemes as RATO (rocket-assisted take-off). Currently, VTOL aircraft are generally in three principal categories: helicopters, tilt rotor aircraft and tail-sitters. These are highly complex and expensive. Accordingly, there is a need for a relatively simple, inexpensive UAV aircraft affording a stable platform and which aircraft has vertical take-off and landing capability.

According to the present invention, there is provided a VTOL free wing aircraft which eliminates the complexities and expense of other types of vertical take-off and landing aircraft, such as helicopters and tilt wing rotor vehicles, and provides a novel and improved VTOL aircraft affording a highly stable platform during horizontal flight without the complexities of wing-mounted engines or rotor blades and attendant structural and other problems. Particularly, the present invention provides an aerodynamic apparatus comprised of a VTOL free wing aircraft having a fuselage with left and right free wings on opposite sides of the fuselage connected one to the other for joint free pivotal movement relative to the fuselage. In accordance with another aspect of the invention, the free wings are, however, rotatable relative to one another under pilot, computer or remote control to differentially alter the angle of attack of the left and right wings while simultaneously maintaining free wing capability relative to the fuselage. That is, the left and right wings are connected one to the other and collectively are free to rotate, depending upon the aerodynamic forces applied to the wings, while simultaneously the pitch of one wing relative to the other wing may be controlled, e.g., by an actuator or a mechanical coupling between the wings or by elevons, which determine the wing pitch of each wing independently of the other. This is significant in vertical take-off and recovery procedures, as well as in horizontal flight for roll control. The VTOL free wing aircraft hereof does not require ailerons for roll control, although they may be provided for that purpose. Rather, the two wings each serve as large aerodynamic surfaces to supply whatever roll forces may be desired. It will be noted that the elevons in those embodiments which use elevons to set the pitch of the wings will not contribute to a desired roll force in most designs. Instead, they turn the wings, which then generate the roll forces.

Other components of the VTOL free wing aircraft hereof include a fuselage having a rudder for maintaining yaw control during vertical flight and an elevator, preferably adjacent the aft end of the fuselage, to assist in transitioning between vertical and horizontal flight. Either or both the rudder and elevator may comprise all moving control surfaces or a movable portion of a fixed stabilizer surface. The elevator is also useful for pointing the fuselage during horizontal flight, for example, to aid in targeting onboard sensors. It will be appreciated that other control systems for rotating the fuselage about the pitch axis may be utilized in lieu of a elevator. For example, a small canard surface adjacent the forward end of the fuselage may be used to transition the aircraft from horizontal to vertical flight and to point the fuselage. Small jets of air may also be used, but afford additional complexities which are not desirable in a UAV aircraft.

Preferably, a tractor-type propulsion system is employed in the VTOL free wing aircraft hereof, not only to facilitate launching the aircraft, but also to afford effective roll, pitch and yaw control during launching and vertical flight at minimum or zero aircraft speed. This is accomplished by allowing the propwash to serve as a source of dynamic pressure or the control surfaces. In one embodiment, the VTOL free wing aircraft of the present invention may sit vertically with the vertical and horizontal stabilizers resting on a horizontal surface prior to launch.

Should that surface be subjected to motion, or the winds which would cause the aircraft to tip over, a launch system may be used to assist in vertical take-off, principally to prevent the UAV from being tipped over by horizontal winds while awaiting launch. For example, the aircraft may be provided with suitable guides which engage a launch rail with the aircraft and rail directed generally vertically. With a tractor-type propulsion system, e.g., one or more propellers at the forward end of the fuselage, the propulsion system is at a location which does not interfere with the launch system. Additionally, the tractor propulsion system provides air flow over at least inboard portions of the free wings, enabling the free wings to react to the aerodynamic forces acting on them and thereby enable positive roll control during initial phases of flight and hover.

The aircraft may be launched in the vertical position with the rail supporting the aircraft. It will be appreciated that, at launch, the free wings are likewise oriented generally vertically and, because of their free pivotal mount, the wings weathervane, minimizing loading on the aircraft at launch. The tractor propulsion system, with possible assist from the launching system such as a catapult assist, enables the aircraft to lift off vertically. The air flow from the propulsion system, e.g., the single propeller or counterrotating propellers, causes airflow over the wings, rudder and elevator. By setting the pitch of one wing relative to the other wing under pilot, computer or remote control, control of the aircraft about the roll axis may be affected while the rudder and elevator provide yaw and pitch control during vertical flight. To transition from vertical to horizontal flight, down elevator causes the aircraft fuselage to pitch forwardly. As the direction of thrust changes, the wings will pivot freely, depending upon the relative wind, and therefore pivot toward a horizontal orientation and commence to develop lift. As the fuselage pitches toward the horizontal and horizontal speed is increased, the effect of the relative wind acting on the wing overcomes the effect of the propeller blast and the wings gradually afford lift to the aircraft principally from the forward or horizontal speed of the aircraft. When horizontal flight is obtained, horizontal free wing flight control, similarly as set forth in my prior application, is maintained.

To transition from horizontal to vertical flight, generally the reverse of the procedure noted above may be followed. For example, up elevator is given to pivot the fuselage about the pitch axis in an upward direction thereby changing the thrust vector. Forward speed slows and the air flow over the free wings eventually is dominated by the prop wash rather than the horizontal speed of the aircraft. In that vertical orientation, the VTOL aircraft can be positioned a short distance above a recovery net and the engine turned off whereby the aircraft will drop gently into the net. This is to be contrasted to the common current practice of flying horizontally into a vertical net, causing great stress on the airframe and instruments. The net may be replaced by any soft support such as foam rubber or possibly a naturally occurring support such as tall grass.

In a preferred embodiment according to the present invention, there is provided an aerodynamic apparatus comprising a vertical take-off and landing aircraft having a fuselage, a wing on each side of the fuselage having an aerodynamic center, means for connecting the wings one to the other and to the fuselage for joint free pivotal movement relative to the fuselage about a spanwise axis forwardly of the aerodynamic centers, means for selectively controllably rotating at least one of the wings relative to the other of the wings for roll control and a common propulsion system for propelling the aircraft in a vertical flight mode including vertical take-off and landing and in horizontal flight.

In a further preferred embodiment according to the present invention, in a vertical take-off aircraft having a fuselage with pitch and yaw controls and a wing on each side of the fuselage having an aerodynamic center, the wings being connected to one another and to the fuselage for joint free pivotal movement relative to the fuselage about a spanwise axis forwardly of the aerodynamic centers and being rotatable relative to one another about the axis for roll control, there is provided a method of transitioning between generally vertical take-off flight and horizontal flight, comprising the steps of propelling the aircraft in the generally vertical direction with the fuselage initially generally vertically oriented and the wings freely rotatable relative to the fuselage in accordance with aerodynamic forces acting on the wings, and actuating the pitch control to pivot the fuselage toward a horizontal orientation and thereby provide a horizontal thrust component so that the aerodynamic forces on the wings pivot the wings relative to the fuselage and provide lift for horizontal flight.

In a further preferred embodiment according to the present invention, in an aircraft having a fuselage with pitch and yaw controls and a wing on each side of the fuselage having an aerodynamic center, the wings being connected to one another and to the fuselage for joint free pivotal movement relative to the fuselage about a spanwise axis forwardly of the aerodynamic centers and being rotatable relative to one another about the axis for roll control, there is provided a method of transitioning between generally vertical and horizontal flight modes with the fuselage oriented generally vertically and horizontally, respectively, comprising the steps of propelling the aircraft in one of the flight modes with the wings freely rotatable relative to the fuselage in accordance with aerodynamic forces acting on the wings and the fuselage in the corresponding orientation, actuating the pitch control to pivot the fuselage toward its orientation in the other of the flight modes and thereby provide a thrust component in the direction of the other flight mode so that the aerodynamic forces on the wings pivot the wings relative to the fuselage toward an orientation in the other flight mode.

Accordingly, it is a primary object of the present invention to provide a novel and improved VTOL free wing aircraft and method of operation.

These and further objects and advantages of the present invention will become more apparent upon reference to the following specification, appended claims and drawings.

BRIEF DESCRIPTION OF THE DRAWING FIGURES

FIG. 1 is a perspective view of a VTOL free wing aircraft according to the present invention and illustrated in a vertical or hover position;

FIG. 2 is a perspective view of a VTOL free wing aircraft of the present invention illustrating horizontal flight and counterrotating propellers;

FIGS. 5a, 5b and 5c are schematic views illustrating various locations of elevators on the trailing edges of the free wings for free wing roll control.

DETAILED DESCRIPTION OF THE DRAWING FIGURES

Figure 6:
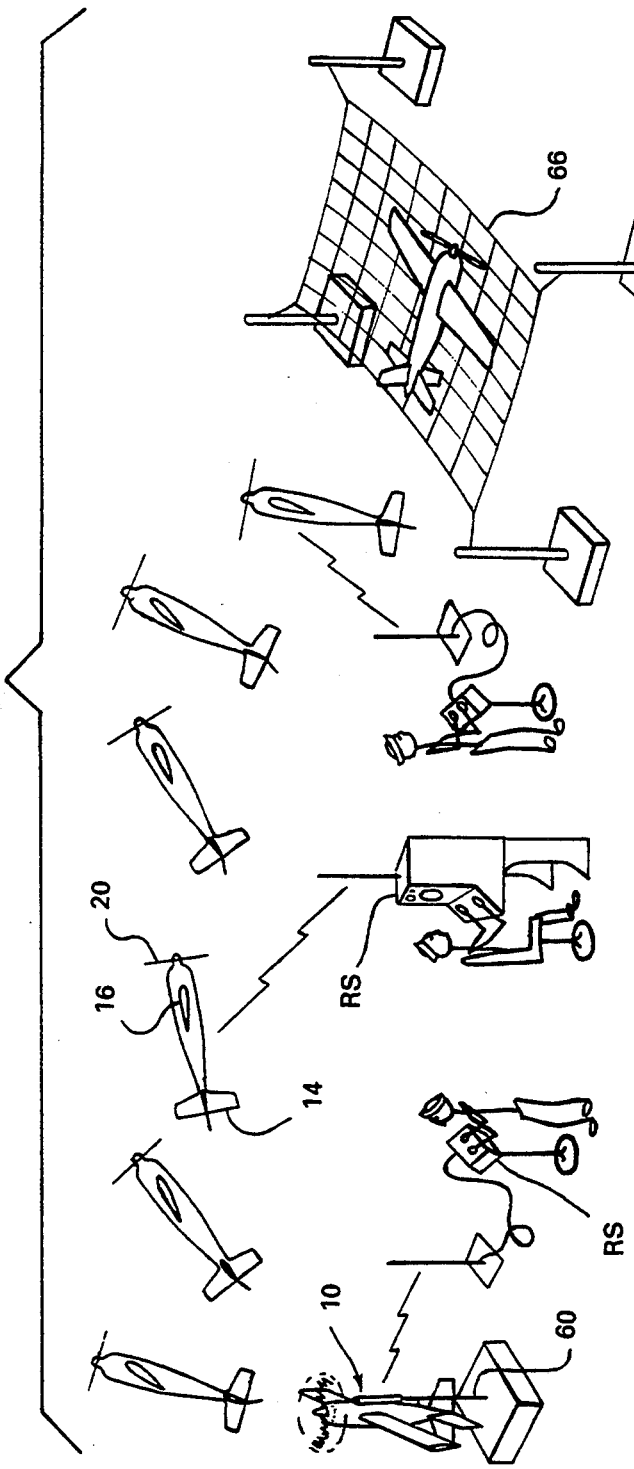
FIG. 6 is a schematic diagram illustrating remote control flight mode of a VTOL free wing aircraft according to the present invention from launch through horizontal flight to recovery.

Reference will now be made in detail to a present preferred embodiment of the invention, an example of which is illustrated in the accompanying drawings.

As illustrated in FIG. 1, the VTOL free wing aircraft of the present invention is generally designated 10 and includes a fuselage 12, a tail section 14, a free wing 16 and a tractor propulsion system including an engine 18 at the forward end of fuselage 12 driving a propeller 20. Free wing 16 is free to rotate or pivot about its spanwise axis 22 forward of its aerodynamic center. Free wing 16 includes left and right wings 16a and 16b extending from opposite sides of fuselage 12 and which wings 16a and 16b are coupled together to collectively freely pivot about axis 22. The left and right wings 16a and 16b are, however, adjustable in pitch relative to one another, as described in the ensuing description. VTOL free wing aircraft 10 also includes rudders 24 and elevators 26 in tail section 14 and which may be controlled in a conventional manner for yaw and pitch control, respectively. While a single propeller for the propulsion system is illustrated at 20 in FIG. 1, it will be appreciated that other types of propulsion systems may be utilized, for example, the counterrotating propellers 28 and 30 illustrated in FIG. 2. The term "common" propulsion system as used herein means the same propulsion system for supplying the necessary thrust for both horizontal and vertical flight and is not limited to a single thrust producing system, e.g., a single propeller, but could include multiple thrust producing systems, e.g., a pair of engines driving separate propellers, provided the multiple thrust producing systems are used for supplying thrust in both vertical and horizontal flight modes.

Figure 3:
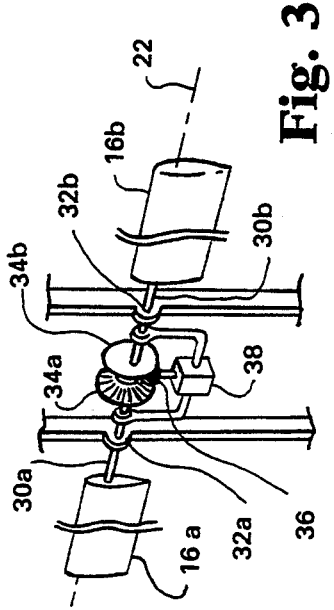
FIG. 3 is a fragmentary perspective view illustrating a connection between the free wings and the fuselage, as well as a mechanism for differentially adjusting the pitch of the free wings.

To mount the free wing 16 for free rotation relative to fuselage 12 and to simultaneously enable rotation of one wing relative to the other wing about spanwise axis 22, the wings 16a and 16b may comprise tubes 30a and 30b forming the main structural part of the wings 16a and 16b as shown in FIG. 3. Tubes 30a and 30b project toward one another within the fuselage and are mounted in bearings 32a and 32b forming part of the fuselage structure whereby the wings 16a and 16b are freely rotatable relative to the fuselage, the tubes having axes coincident with spanwise axis 22. To enable the wings to freely jointly rotate and simultaneously enable rotation of one wing relative to the other for roll control, the inboard ends of tubes 30a and 30b may terminate in a pair of laterally spaced, bevel gears 34a and 34b having a cooperating drive gear 36 in meshing engagement therewith. Drive gear 36 is connected to a reduction gear motor 38 suitably supported by bearings by the rotatable wing structure. It will be appreciated that rotation of drive gear 36 in one direction causes pivotal motion of the wings 16a and 16b in opposite directions about the spanwise axis 22 while rotation of drive gear 36 in the opposite direction causes the reverse opposite rotation of the wings 16a and 16b about axis 22.

Figure 4:
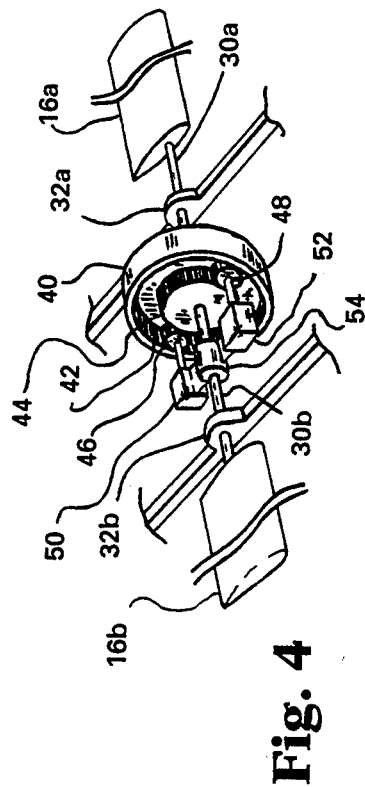
FIG. 4 is a perspective view of another form of the apparatus for differentially adjusting the pitch of the free wings.

Referring now to FIG. 4, there is illustrated another form of mechanism for affording selective differential rotation of free wings 16a and 16b. In FIG. 4, the structural tubes 30a and 30b are mounted in bearings 32a and 32b forming part of the structure of the fuselage. Structural tube 30a terminates at its inner end in an outer ring gear 40 having gear teeth 42 along its inner surface. Structural tube 30b terminates in a gear 44 disposed within outer ring gear 40. Small geared pinions 46 and 48 cooperate between gears 40 and 44. The structural tubes 30a and 30b are locked against rotation relative to one another by the gearing arrangement. Pinions 46 and 48 are connected by shafts to motors 50 and 52, respectively, jointly mounted on a base 54. Base 54 is carried by bearings, not shown, for rotation on tube 30b. Consequently, by activating either or both motors to drive its corresponding pinion, the wings 16a and 16b may be differentially rotated relative to one another while simultaneously both wings remain freely pivotal relative to the fuselage.

It will be understood that elevons 57 may be used to set the pitch of the wings. That is, the motor and gear mechanisms described above will set the pitch of one wing relative to the other while the elevon sets the reference pitch of the two wings.

Other mechanisms may be employed to afford free wing roll control. For example and with reference to FIGS. 5a, 5b and 5c, elevons 57 may be provided along the trailing edges of wings 16a and 16b either outboard of the propwash indicated by the dashed lines on these figures at 57a in FIG. 5a, inboard of the propwash at 57b in FIG. 5b or both, at 57c in FIG. 5c. By selective operation of the elevons, the pitch of the free wings may be selectively changed independent of each other and hence both roll and lift control may be achieved. When the pitch of the wing is determined by adjusting the elevons, a mechanical actuator, setting the pitch of one wing relative to the other, is not required and such mechanical actuator might be disengaged or eliminated entirely.

Referring now to FIG. 6, the operation of the VTOL free wing aircraft will now be described. At launch, the aircraft is mounted in a vertical orientation on a rail system which is schematically illustrated at 60. The rail system may comprise simply a guide or a track with complementary guide or track following members on the aircraft for guiding the aircraft for vertical movement for a limited initial predetermined distance at liftoff. It will be appreciated that, because of the unassisted vertical take-off, the propulsion system 18 has a thrust sufficient such that the aircraft has a ratio of thrust to aircraft weight in excess of one. With the engine started and the propeller backwash providing an air flow over the wings 16a and 16b, aircraft 10 lifts off launch rail 60. Catapult assist may be provided. Yaw and pitch control is maintained by rudder 24 and elevator 26, respectively. Roll control is achieved by differential setting of the pitch of the free wings 16a and 16b under pilot, or computer control or, as illustrated, remote control from a remote controller station RS. The air flow over wings 16a and 16b thus provides sufficient dynamic forces on the wings to control the roll of the aircraft during launch. It will be appreciated that the wings at launch are freely rotatable. Note also that there is dynamic pressure on all control surfaces as a result of the backwash from the propulsion system so that roll, pitch and yaw control over the aircraft is maintained during the initial phases of the vertical launch.

To transition from vertical to horizontal flight, the pilot, computer or remote controller gives a down elevator signal, causing the fuselage to pitch toward a horizontal orientation. By pitching the fuselage, the thrust vector also inclines from the vertical and thus has a horizontal thrust component. As the fuselage pitches toward the horizontal, the horizontal speed of the aircraft increases, causing the freely rotatable wing 16 to rotate relative to the fuselage in accordance with the relative wind. The effects of the relative wind acting on the freely rotating wing quickly overcome the effects of the airflow over the wings from the propulsion system and, with increasing horizontal speed, the wing develops lift. As illustrated in FIG. 6, the aircraft soon transitions into horizontal flight in a free wing flight mode.

Should the aircraft lose power during launch or vertical flight, the aircraft will rapidly and automatically transition into a horizontal flight mode with minimum altitude loss. When power is lost, free wing 16 weathervanes into the new relative wind, which would appear to the wing to be coming vertically upwardly from the ground, and thus obtains a leading edge down orientation while the fuselage will be oriented into the relative wind by the action of the rudder and elevators. Because the free wings use positive pitching moment airfoils, the aircraft will quickly transition itself into stable level flight.

During horizontal flight, pitch, yaw and roll control are provided by the elevators, rudders and differentially pivoted wings 16a and 16b. Ailerons may be provided on wing 16 if desired.

To transition from horizontal to vertical flight, the reverse procedure is employed. That is, an up elevator command is given, to rotate the fuselage toward a vertical orientation with its nose upwardly. Horizontal speed is thus decreased and a vertical thrust vector is introduced. Accordingly, the relative wind changes and the free wing and fuselage ultimately both rotate into a vertical orientation. If the aircraft resists slowing and does not reduce its forward or horizontal speed sufficiently, the fuselage, by operation of the elevator, could be rotated past vertical so that the thrust line serves as a thrust reverser, slowing the aircraft past stall. Alternatively, the mechanism of my prior application may be utilized. That is, the wing could be locked to the fuselage before rotating the fuselage up. By stalling the aircraft and, hence, achieving a reduction to zero forward horizontal air speed, followed by release of the free wing upon stalling, the aircraft may be positioned in the vertical orientation. A further alternative to reduce horizontal speed while transitioning from horizontal to vertical flight is to provide wing devices such as spoilers or elevators at the trailing edge of the wing. Still further, a canard could be located in the nose of the fuselage to provide leverage to the fuselage to transition to the vertical. A canard, of course, could be recessed within the nose of the aircraft and displaced outwardly of the aircraft at the time of the transition to leverage the fuselage upwardly. The canard, of course, in any event could be a free wing or fixed. Once vertical or near vertical flight is achieved, the pitch, roll and yaw commands again control the position of the aircraft to a location directly over a net 66. When located over the net, the engine is turned off and the aircraft drops into the net.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. Aerodynamic apparatus comprising:
    an aircraft having a fuselage, a wing on each side of said fuselage having an aerodynamic center, means for connecting said wings one to the other and to said fuselage for free pivotal movement relative to said fuselage about a spanwise axis forwardly of said aerodynamic center for flight in a first free wing flight made with the fuselage generally horizontal relative to a predetermined direction of flight and in a second free wing flight mode with the fuselage inclined relative to the predetermined direction of flight;
    means for differentially altering the angle of attack of said wings relative to one another while maintaining free pivotal movement of said wings relative to said fuselage to enable roll control;
    means for controlling the fuselage in pitch independently of said wings to vector said fuselage relative to said predetermined direction of flight thereby to establish a predetermined angle of incidence of said fuselage relative to said direction of flight; and
    a common propulsion system for propelling the aircraft in said first and second flight modes.

2. Apparatus according to claim 1 wherein said common propulsion means includes a tractor propulsion system carried by said fuselage and located to afford air flow over said wings so that said differential angle of attack altering means enables roll control during transition between said first and second flight modes.

3. Apparatus according to claim 2 wherein said tractor propulsion system includes a propeller rotatable in one direction to develop thrust.

4. Apparatus according to claim 2 wherein said tractor propulsion system includes counterrotating propellers to minimize rotation of said aircraft about a roll axis.

5. Apparatus according to claim 1 wherein said wings are set at different angles of incidence relative to one another to minimize rotation of said aircraft about a roll axis.

6. Apparatus according to claim 1 wherein said fuselage carries an elevator and a rudder for pitch and yaw control, respectively.

7. Apparatus according to claim 1 wherein the roll control is provided solely by rotating at least one wing relative to the other wing wherein said wings serve as ailerons.

8. Apparatus according to claim 1 wherein the roll control is provided by elevators located in said freely pivotable wings.

9. Apparatus according to claim 8 wherein said common propulsion means includes a tractor propulsion system carried by said fuselage and located to afford air flow over said wings so that said altering means enables roll control during transition between said first and second flight modes and an elevator is located in each free wing within the air flow over said wings caused by said tractor propulsion system.

10. Apparatus according to claim 1 wherein said common propulsion system has a thrust sufficient such that said aircraft has a ratio of thrust, from said common propulsion system, to aircraft weight in excess of one.

11. Apparatus according to claim 1 wherein said common propulsion system has the capacity to propel the aircraft in generally horizontal flight in said first free wing flight mode and in vertical flight, including vertical take-off, in said second free wing flight mode.

12. A thrust vectoring free wing aircraft comprising:
a fuselage;
a wing having an aerodynamic center and connected to said fuselage for free pivotal movement about a spanwise axis for flight in a predetermined generally horizontal direction in a free wing mode of aircraft operation;
a propulsion system carried by said fuselage for developing thrust and propelling the aircraft, said propulsion system including at least one unducted propeller for propelling said aircraft both in said predetermined direction and in a near vertical flight orientation; and
aerodynamic surfaces carried by said fuselage for vectoring the thrust of said propulsion system away from the predetermined direction of flight sufficiently to achieve said near vertical flight orientation, thereby establishing an angle between the fuselage and the direction of flight.

13. An aircraft according to claim 12 wherein the fuselage has a longitudinal axis extending substantially parallel to the predetermined direction of flight to establish a first free wing mode of flight, the axis of said fuselage being inclined to said predetermined direction when the thrust is vectored away from the predetermined direction of flight to establish a second free wing mode of flight with said fuselage near vertical flight orientation, thereby reducing wing loading and aircraft speed.

14. An aircraft according to claim 13 wherein said common propulsion system has a thrust sufficient such that said aircraft has a ratio of thrust, from said propulsion system, to aircraft weight in excess of one.

15. An aircraft according to claim 14 wherein said propulsion system has the capacity to propel the aircraft in generally horizontal flight in said first free wing mode of flight and in free wing vertical flight in said second free wing mode of flight mode.

16. An aircraft according to claim 12 wherein the axis of said free wing passes through said fuselage.

17. An aircraft according to claim 12 wherein said propulsion system includes a propeller for developing propwash, and control surfaces carried by said aircraft and located within the propwash for controlling the aircraft in roll, pitch and yaw.

18. An aircraft according to claim 12 wherein said aerodynamic surfaces carried by said fuselage include all-moving stabilizer surfaces.

* * * * *